United States Patent
Nishida

(10) Patent No.: US 8,762,082 B2
(45) Date of Patent: Jun. 24, 2014

(54) WIRELESS NETWORK USING SIGNAL STRENGTH TO DETECT THE MOVEMENT OF A MOBILE DEVICE

(75) Inventor: Yoshifumi Nishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1118 days.

(21) Appl. No.: 11/845,228

(22) Filed: Aug. 27, 2007

(65) Prior Publication Data
US 2008/0058104 A1    Mar. 6, 2008

(30) Foreign Application Priority Data
Aug. 28, 2006 (JP) ................. 2006-231156

(51) Int. Cl.
*G01S 5/02* (2010.01)
*G01S 5/04* (2006.01)

(52) U.S. Cl.
USPC ............ 702/60; 702/66; 702/71; 342/28; 455/456.2; 455/456.5; 73/1.37; 463/39

(58) Field of Classification Search
USPC ........... 73/1.37; 342/28; 702/57, 60, 66, 71; 455/456.2, 456.5
See application file for complete search history.

(56) References Cited

U.S. PATENT DOCUMENTS

| 5,243,537 A * | 9/1993 | Neumann ................. 702/66 |
| 7,099,676 B2 * | 8/2006 | Law et al. ............... 455/456.6 |
| 7,129,891 B2 * | 10/2006 | Meunier ................. 342/463 |
| 7,209,751 B2 | 4/2007 | Nishida et al. |
| 7,667,646 B2 * | 2/2010 | Kalliola et al. ............ 342/417 |
| 2004/0263388 A1 * | 12/2004 | Krumm et al. ........... 342/451 |

FOREIGN PATENT DOCUMENTS

| JP | 10-023519 | 1/1998 |
| JP | 2005-065125 | 3/2005 |
| JP | 2006-39762 | 2/2006 |

* cited by examiner

*Primary Examiner* — Lawrence Galka
(74) *Attorney, Agent, or Firm* — Finnegan, Henderson, Farabow, Garrett & Dunner, LLP

(57) ABSTRACT

A movement detection system is provided with a wireless terminal, and a movement detection device connectable to the wireless terminal via a wireless network such that the wireless terminal receives signals used for detection at a predetermined frequency from the movement detection device, and transmits verification signals in response to each of the detection signals. The movement detection device includes a measurement portion that measures the signal strength of the verification signals transmitted by the wireless terminal, and a detection portion that detects spatial movement of the wireless terminal based on the signal strength of the verification signals measured by the measurement portion.

11 Claims, 9 Drawing Sheets

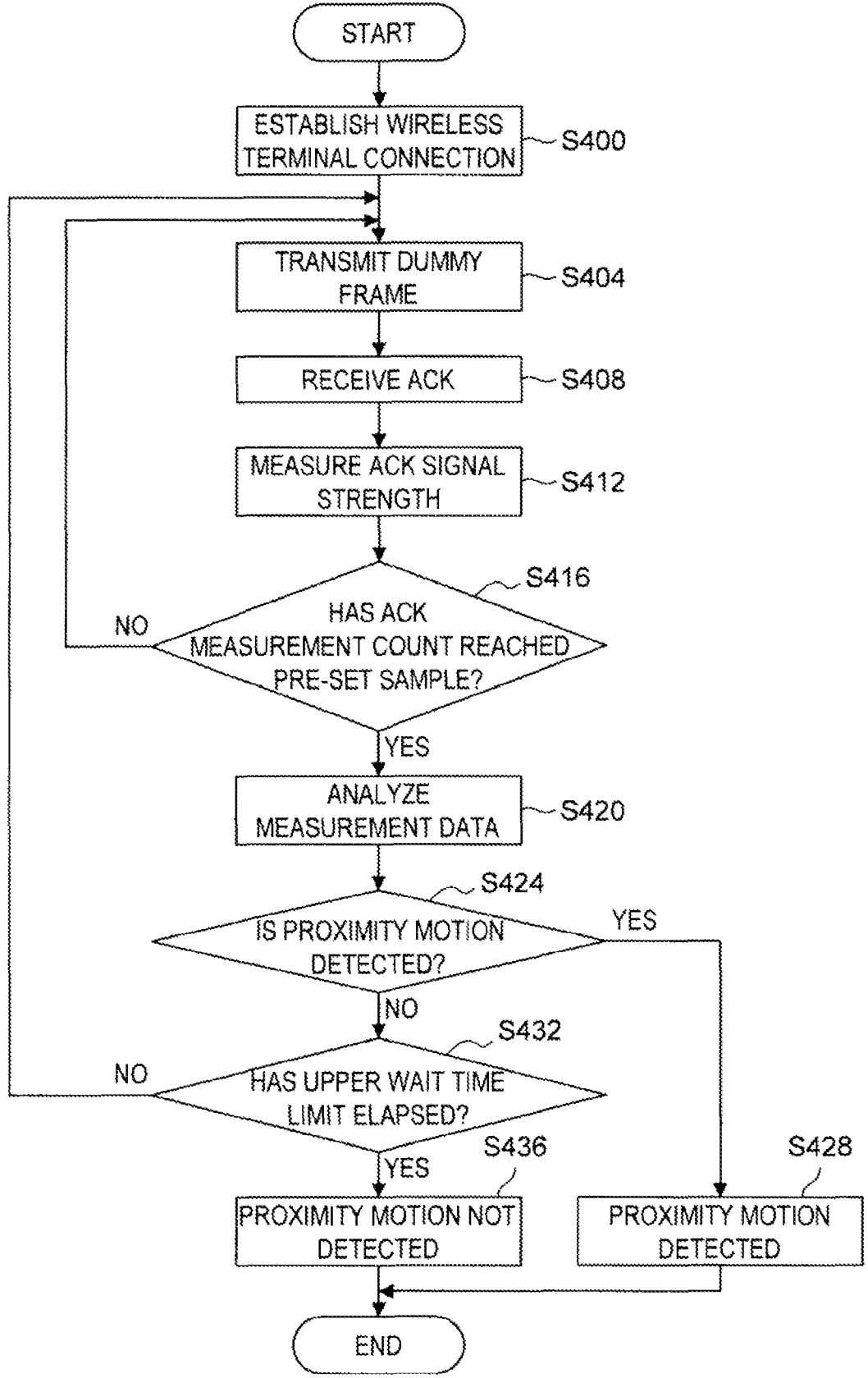

WIRELESS NETWORK USING SIGNAL STRENGTH TO DETECT THE MOVEMENT OF A MOBILE DEVICE

CROSS REFERENCES TO RELATED APPLICATIONS

The present invention contains subject matter related to Japanese Patent Application JP 2006-231156 filed in the Japan Patent Office on Aug. 28, 2006, the entire contents of which being incorporated herein by reference.

BACKGROUND OF THE INVENTION

1. Field of the Invention

The present invention relates to a movement detection system, a movement detection device, a movement detection method and a computer program.

2. Description of the Related Art

In recent years, information processing devices including personal computers (PCs) and personal digital assistants (PDAs) are commonly equipped as standard with wireless network technologies conforming to the IEEE (Institute of Electrical and Electronics Engineers, Inc.) 802.11 series of standards. There is also increasing demand for the development of systems that detect the movement speed or the spatial movement of information processing devices functioning as wireless terminals.

To fulfill the above-mentioned demand, methods have been suggested in which a short-range wireless technology near field communication (NFC) technology, is embedded in the wireless terminal. NFC technology offers a speed of around 100 to 400 kbps and was developed for use in intercommunication with a NFC-compatible device in a close vicinity of approximately 10 cm. If the NFC technology is embedded in a wireless terminal, and the wireless terminal is moved closer to a specified object, the specified object detects the approaching motion of the wireless terminal, and a system can be realized in which processing operations set up in advance can be performed. However, embedding the above-mentioned wireless network technology and the NFC technology in the same information processing device leads to increased complexity of the device structure and an increase in manufacturing costs.

Methods have also been suggested where wireless network technology conforming to IEEE802.11 standards is not used merely for transmitting and receiving information, but also to detect spatial movement of a wireless terminal. A system that measures the strength of a signal output by a wireless terminal and determines the movement speed of that wireless terminal based on changes in the signal strength is disclosed, for example, in Japanese Patent Application Publication No. JP-2006-39762. Alternatively, a system that measures the strength of a beacon signal output by a wireless device and detects spatial movement of the wireless device based on changes in the signal strength is disclosed, for example, in US Patent No. 2005/0221829 [U.S. Pat. No. 7,209,751 B2].

SUMMARY OF THE INVENTION

However, known systems using wireless technology conforming to IEEE802.11 standards are structured simply to operate based on changes in the strength of the signals transmitted by the wireless terminal, and it is not always possible to detect the speed of movement of the wireless terminal or accurately detect the spatial movement of the wireless terminal.

Thus, it is desirable to provide a movement detection system that accurately detects spatial movement of a wireless terminal using wireless network technology. The present invention provides a new and improved movement detection system, a movement detection device, a movement detection method and a computer program.

According to an embodiment of the present invention, there is provided a movement detection system that includes a wireless terminal, and a movement detection device connectable to the wireless terminal via a wireless network. The wireless terminal receives detection signals transmitted by the movement detection device at a predetermined frequency and transmits a verification signal in response to each detection signal received. The movement detection device includes a measurement portion that measures the signal strength of the verification signals transmitted by the wireless terminal, and a detection portion that detects the spatial movement of the wireless terminal based on the signal strength of the verification signals measured by the measurement portion.

In this configuration, when the wireless terminal receives a detection signal transmitted by the movement detection device the wireless terminal transmits a verification signal. As the movement detection device transmits the detection signals at a predetermined frequency, the wireless terminal also transmits the verification signals at a predetermined frequency. Also, the strength of the verification signals received by the movement detection device changes depending on the distance between the movement detection device and the wireless terminal. Therefore, the movement detection device can detect spatial movement of the wireless terminal based on the signal strength of the verification signals.

According to another embodiment of the present invention, there is provided a movement detection device connectable to a wireless terminal via a wireless network. The movement detection device includes a detection signal transmission portion that transmits detection signals to the wireless terminal at a predetermined frequency, a measurement portion that measures signal strength of verification signals transmitted by the wireless terminal in response to each of the detection signals, and a detection portion that detects spatial movement of the wireless terminal based on the signal strength of the verification signals measured by the measurement portion.

In this configuration, the movement detection device can transmit detection signals to the wireless terminal, and cause the wireless terminal to transmit verification signals in response. As the movement detection device transmits the detection signals at a predetermined frequency, it causes the wireless terminal to also transmit the verification signals at a predetermined frequency. Also, the strength of the verification signals received by the movement detection device changes depending on the distance between the movement detection device and the wireless terminal. Therefore, the movement detection device can detect spatial movement of the wireless terminal based on the signal strength of the verification signals.

The detection signals may be data frames that contain no data information. If this configuration is adopted, the data capacity used for the detection signals can be minimized. Therefore, the wireless communication bandwidth used to repeatedly transmit detection signals by the movement detection device can be reduced and most of the wireless communication bandwidth capacity can be allocated to the transmission and reception of other fundamental information.

The spatial movement may be movement that lengthens or shortens the distance between the wireless terminal and the measurement portion.

A configuration may be adopted that includes a measurement count determination portion that determines whether a measurement count that is the number of measurements of the signal strength of the verification signals received by the measurement portion has reached a pre-set sample count. If the measurement count determination portion determines that the measurement count has reached the pre-set sample count, the detection portion can detect the movement of the wireless terminal. In this configuration, the measurement count determination portion monitors the number of measurements of the signal strength of the verification signals and compares the measurement count with the pre-set sample count. Then, when the measurement count has reached the pre-set sample count, the measurement count determination portion starts processing by the detection portion. Therefore, the detection portion can more accurately detect the spatial movement of the wireless terminal based on the signal strength of a sufficient number of verification signals.

The detection portion may detect the spatial movement of the wireless terminal based on whether the signal strength of the verification signals changes exponentially or not. Here, the signal strength of the verification signals transmitted by the wireless terminal via the wireless network may change exponentially if the distance between the wireless terminal and the measurement portion changes at a uniform speed. Therefore, based on whether the signal strength of the verification signals changes exponentially or not, the detection portion can, for example, detect the movement of the wireless terminal, which may be, for example, a movement in which the distance between the wireless terminal and the measurement portion is changed at a uniform speed.

A configuration may be adopted that includes an elapsed time determination portion that determines whether or not a pre-set upper wait time limit has elapsed from the point at which the detection signal transmission portion starts transmission of the detection signals. In this configuration, the spatial movement of the wireless terminal may not be detected after the elapsed time determination portion determines that the upper wait time limit has elapsed. According to this configuration, the elapsed time determination portion monitors the time elapsed from the point at which the detection signal transmission portion starts transmission of the detection signals, and compares the time elapsed with the upper wait time limit. Then, if the elapsed time determination portion determines that the elapsed time has reached the upper wait time limit, it may, for example, stop the detection of the spatial movement of the wireless terminal. Therefore, the elapsed time determination portion can control the period of time in which it is possible to detect the spatial movement of the wireless terminal.

The measurement portion may also be provided in a plurality, in at least two or more different locations, and the detection portion may detect the spatial movement of the wireless terminal based on the signal strength of the verification signals measured by each measurement portion. If this configuration is adopted, the detection portion can detect diverse spatial movements of the wireless terminal based on the differences in the signal strength of the verification signals measured by multiple measurement portions.

According to another embodiment of the present invention, there is provided a movement detection method for detecting movement of a wireless terminal via a wireless network. The movement detection method includes a step of transmitting detection signals at a predetermined frequency to the wireless terminal; a step of measuring the signal strength of verification signals transmitted by the wireless terminal in response to each of the detection signals; and a step of detecting spatial movement of the wireless terminal based on the signal strength of the verification signals measured by the measurement portion.

According to another embodiment of the present invention, there is provided a computer program that includes instructions that command a computer to function as a detection signal transmission portion that transmits detection signals via a wireless network to a wireless terminal at a predetermined frequency; a measurement portion that measures the signal strength of verification signals transmitted by the wireless terminal in response to each of the detection signals; and a detection portion that detects spatial movement of the wireless terminal based on the signal strength of the verification signals measured by the measurement portion.

According to the embodiments of the present invention described above, it is possible to accurately detect the spatial movement of a wireless terminal using wireless technology.

BRIEF DESCRIPTION OF THE DRAWINGS

FIG. 8 is a flow chart showing the operating flow of a movement detection device according to the first embodiment of the present invention.

DETAILED DESCRIPTION OF THE PREFERRED EMBODIMENTS

Figure 1:
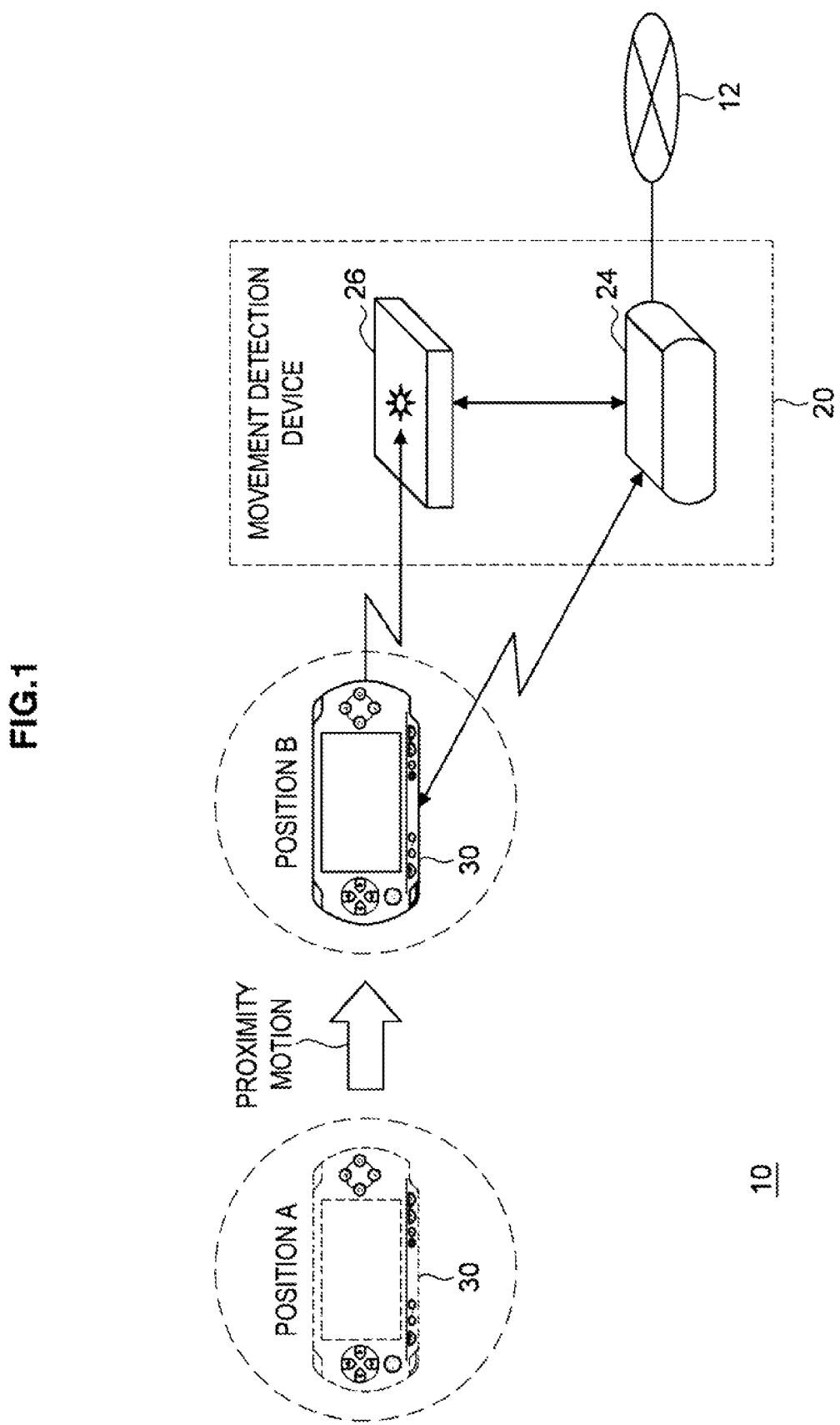
FIG. 1 is an explanatory diagram showing the structure of a movement detection system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, an outline of a movement detection system according to a first embodiment of the present invention will be explained with reference to FIG. 1.

FIG. 1 is an explanatory diagram showing the structure of a movement detection system 10 according to the present embodiment. The movement detection system 10 includes a communication network 12, a movement detection device 20 and a wireless terminal 30.

The movement detection device 20 includes an access point 24 and a station 26. The access point 24 is connected by a wired or wireless connection to the communication network 12, which is an Internet or Ethernet™ network or the like. The access point 24 can be connected via a wireless local area network (LAN), which functions as a wireless network, to a wireless terminal 30, where the access point 24 functions as a wireless LAN base station.

The above wireless LAN may be configured based on wireless network technology conforming to the IEEE802.11 series of standards. Examples of the IEEE802.11 series of standards that may be used as a basis for configuring the wireless LAN include IEEE802.11 that uses a frequency bandwidth of 2.4 GHz and a data transmission speed of 1-2 Mbps, IEEE802.11b that uses a frequency bandwidth of 2.4 GHz and a data transmission speed of 11 Mbps, IEEE802.11a in that uses a frequency bandwidth of 5 GHz and a data transmission speed of 54 Mbps, and IEEE802.11g that uses a frequency bandwidth of 2.4 GHz and a data transmission speed of 54 Mbps.

The wireless LAN may be configured in art infrastructure mode or an ad-hoc mode. An infrastructure mode wireless LAN, as shown in FIG. 1, includes the access point 24 connected to the telecommunications network 12, and the wireless terminal 30 provided within the access point 24 radio wave propagation range. In the infrastructure mode, when data is transmitted from a single wireless terminal to another terminal, the data is relayed by the access point 24. The data transmission process will be explained with reference to FIG. 2.

Figure 2:
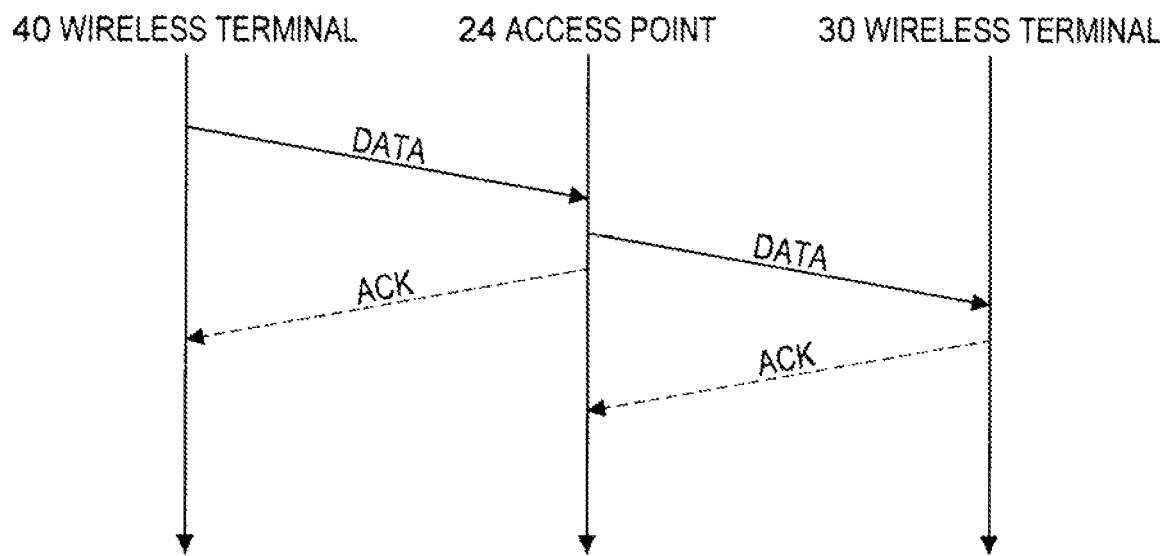
FIG. 2 is an explanatory diagram showing data transmission in an infrastructure mode.

FIG. 2 is an explanatory diagram showing data transmission in the infrastructure mode. As shown in FIG. 2, when a wireless terminal 40 (not shown in FIG. 1) transmits data to the wireless terminal 30, the access point 24 first receives the data transmitted by the wireless terminal 40. Then, the access point 24 transmits the data to the wireless terminal 30, while simultaneously transmitting an acknowledgement signal (ACK) to the wireless terminal 40 to confirm reception of the data. Consecutively, the wireless terminal 30 receives the data from the access point 24 and transmits an ACK signal to the access point 24. The access point 24 receives the ACK signal from the wireless terminal 30, which completes the data transmission from the wireless terminal 40 to the wireless terminal 30.

An ad-hoc mode wireless LAN is not provided with the access point 24 and includes the wireless terminal or terminals only. In this specification, the explanation focuses on an infrastructure mode wireless LAN, but the present invention can also be applied to an ad-hoc mode wireless LAN.

The station 26 receives an ACK signal transmitted by the wireless terminal 30, measures the received ACK signal (electric field) strength and detects the movement of the wireless terminal 30 based on the signal strength. An explanation follows of the relationships between the signal strength, and the distance between the station 26 and the wireless terminal 30.

In the IEEE802.11 series of standards, transition loss $\Gamma$ (dB) for signals (radio waves) in free space may be shown, for example, by the following mathematical Formula 1.

Formula 1

$$\Gamma = 10\log\left(\left(\frac{4\pi d}{\lambda}\right)^2\right)$$ (Formula 1)

Here, $\lambda$ (m) is signal wavelength, and d(m) is the distance between the station 26 and the wireless terminal 30.

Using the figure $\Gamma$ obtained in Formula 1, the station 26 received power Pr (dBm) can be expressed by the following mathematical Formula 2.

Formula 2

$$P_r = P_t - \Gamma + G_t + G_r$$ (Formula 2)

Here, Pt(dBm) is the transmission power of the signal transmitted by the wireless terminal 30, Gt (dBi) is the transmission antenna gain and Gr (dBi) is the reception antenna gain.

Therefore, if the distance between the signal-receiving station 26 and the wireless terminal 30 changes from $d_{d0}$ (m) to d (m), the received power Prd (dBm) of the signal received by the station 26 can be expressed by the following mathematical Formula 3.

Formula 3

$$P_{rd} = P_{rd0} - 20\log\left(\frac{d}{d0}\right)$$ (Formula 3)

Here, Prd (dBm) is the station 26 received power when the station 26 and the wireless terminal 30 are separated by distance d (m), and Prd0 (dBm) is the station 26 received power when the station 26 and the wireless terminal 30 are separated by distance d0 (m).

Formula 3 can be used to establish that, if toe distance between the station 26 and the wireless terminal 30 decreases, the station 26 received power increases exponentially. Note that, if the station 26 received power in relation to base time t0 is Pt0 (dBm), and the station 26 received power in relation to time t is Pt, the difference in received power Dt is defined by the following mathematical Formula 4.

Formula 4

$$D_t = P_t - P_{t0}$$ (Formula 4)

If changes in time t for the difference Dt are analyzed using regression analysis for example, proximity motion of the wireless terminal 30 can be detected. The process for detecting the proximity motion will be explained in more detail later.

In this way, the station 26 measures the signal strength of the signal transmitted by the wireless terminal 30 to the station 26 as received power, and can detect the spatial movement of the wireless terminal 30, based on changes in the signal strength. In the present embodiment, the spatial movement is assumed to be proximity motion where the wireless terminal 30 moves closer to the station 26, or separation motion where the wireless terminal 30 moves further away from the station 26. However, the absolute position of the wireless terminal 30 does not have to move, the station 26 may also be moved. In other words, the spatial movement of the wireless terminal 30 means the movement of the wireless terminal 30 relative to the station 26.

The wireless terminal 30 is an information processing device fitted with wireless telecommunication functions as part of a wireless LAN. This information processing device may be, for example, a personal computer, a household image processing device (DVD recorder, video deck, or the like), a mobile telephone, a Personal Handyphone System (PHS), a mobile music playback device, a mobile image processing device, a personal digital assistant (PDA), a household game console, a mobile game machine, a household electrical appliance or the like. Note that the access point 24 and the station 26 may also be configured as information processing devices like those described above.

The wireless terminal 30 transmits signals to and receives signals from the access point 24, and the signals can also be received by the station 26. Therefore, as shown in FIG. 1, during the period in which the wireless terminal 30 continuously transmits signals, if the wireless terminal 30 is moved from position A to position B, which is closer to the station 26 (proximity motion), the station 26 receives the signals and can detect the proximity motion based on changes in the strength of the signals.

Here, the proximity motion may refer to an approaching movement, for example a movement in which an interval of approximately 30-60 cm between the wireless terminal 30 and the station 26 becomes an interval of less than 10 cm within a 2-second period of time. In this case, if the wireless terminal 30 transmits a signal at a frequency interval of once every second, for example, the signal will only be transmitted once or twice, or the signal may be unstable, which makes it difficult for the station 26 to obtain sufficient information about the signal strength in order to accurately detect the proximity motion.

For example, if the wireless terminal 30 regularly transmits a beacon signal, it is possible to measure the beacon signal strength to detect the proximity motion. However, if the beacon signal is only transmitted infrequently such as at an approximately 30-second interval, the signal strength can only be measured a few times, resulting in concerns about the quality of measurement accuracy.

A system using the strength of the signals transmitted by the wireless terminal 30 to determine the wireless terminal 30 position has also been researched. Assuming use of the system in a relatively large space, such as inside an office or a store, large position detection accuracy errors ranging from around 2-4 m will arise. This is because signals transmitted in accordance with to IEEE801.11 standards are susceptible to obstacle and multipath interference. If a complete lack of obstacles is posited, it is theoretically possible to determine the position of the wireless terminal 30 to the closest 10 cm. However, people are also obstacles, and thus it is unrealistic to expect a complete lack of obstacles in a relatively large space, such as inside an office or a store. For this reason, it is difficult to use the system to detect the movement of the wireless terminal 30 to an accuracy of 10 cm or less.

The present invention addresses the above-identified problems, and with the movement detection system 10 according to the present embodiment, it is possible for the wireless terminal 30 to transmit signals at a sufficiently frequent interval to allow the detection of the proximity motion of the wireless terminal 30. Below, the structure and the operation of the movement detection device 20 that forms a part of the movement detection system 10 according to the present embodiment will be described in more detail.

Figure 3:
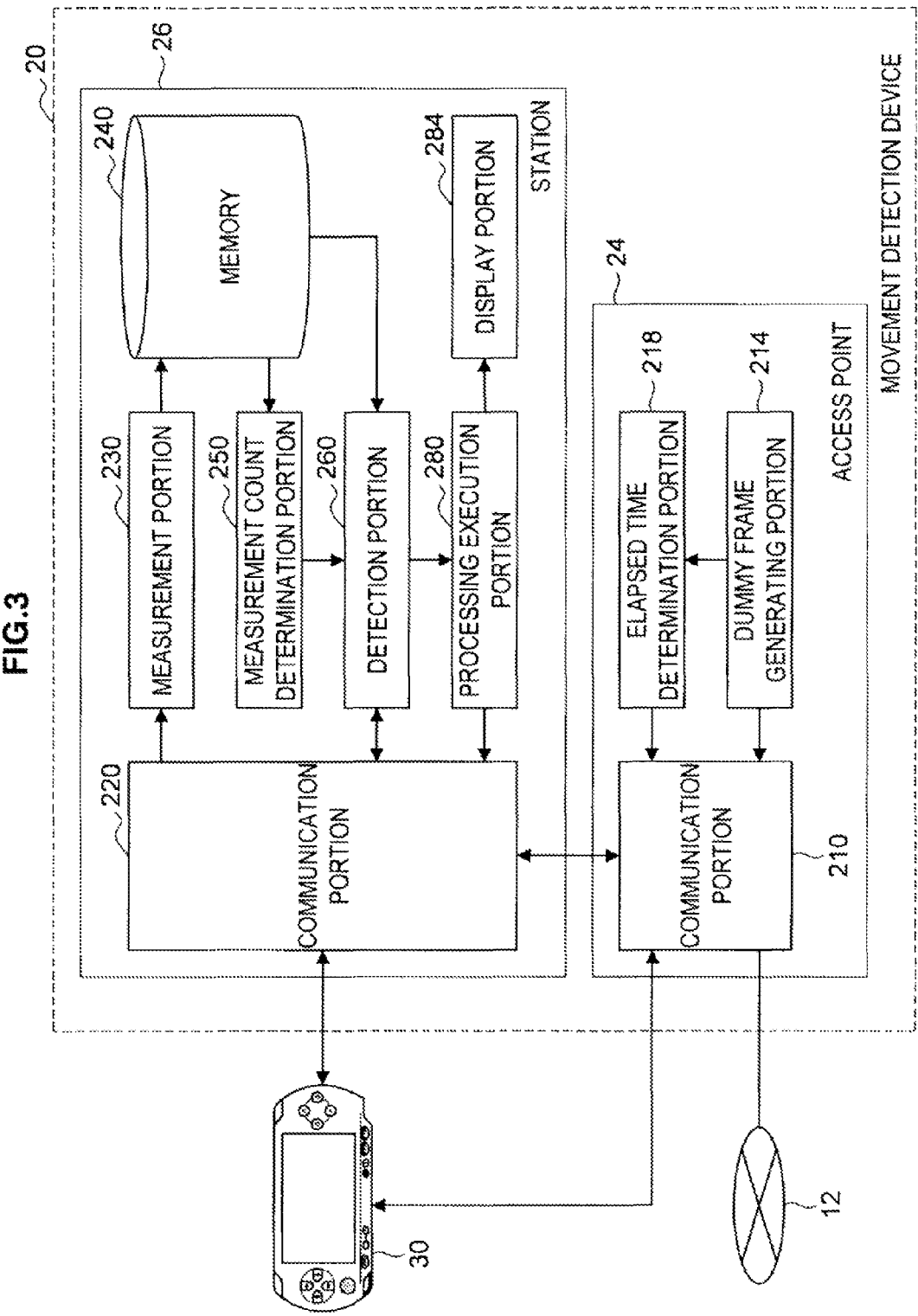
FIG. 3 is a block diagram showing the structure of the movement detection system according to the first embodiment.

FIG. 3 is a block diagram showing the structure of the movement detection device 20 according to the present embodiment. The movement detection device 20 includes a communication portion 210 and a communication portion 220, a dummy frame generating portion 214, an elapsed time determination portion 218, a measurement portion 230, a memory 240, a measurement count determination portion 250, a detection portion 260, a processing execution portion 280, and a display portion 284.

The communication portion 210 functions as an interface for signal transmission and reception between the access point 24, the communication network 12, the station 26 and the wireless terminal 30. The communication portion 210 may, for example, transmit and receive signals through a wired or wireless connection to the communication network 12, through a wired or wireless connection to the station 26, and via a wireless network conforming to IEEE802.11 standards to the wireless terminal 30. In the same way, the communication portion 220 may, for example, transmit and receive signals through a wired or wireless connection to the access point 24 and via a wireless network conforming to IEEE802.11 standards to the wireless terminal 30.

The dummy frame generating portion 214 generates dummy frames at a predetermined frequency, and transmits the dummy frames to the wireless terminal 30. The dummy frames are data frames that contain no or almost no data information. The wireless terminal 30 transmits an ACK signal to the station 26 upon receipt of each dummy frame.

The station 26 according to the present embodiment can detect the spatial movements of the wireless terminal 30 based on the strength of the ACK signals transmitted to the station 26. Therefore, the dummy frames function as detection signals for the detection of the spatial movement of the wireless terminal 30. Furthermore, the dummy frame generating portion 214, in coordination with the communication portion 210, functions as a detection signal transmission portion. Next, the dummy frames and the ACK signals will be explained with reference to FIG. 4 and FIG. 5.

Figure 4:
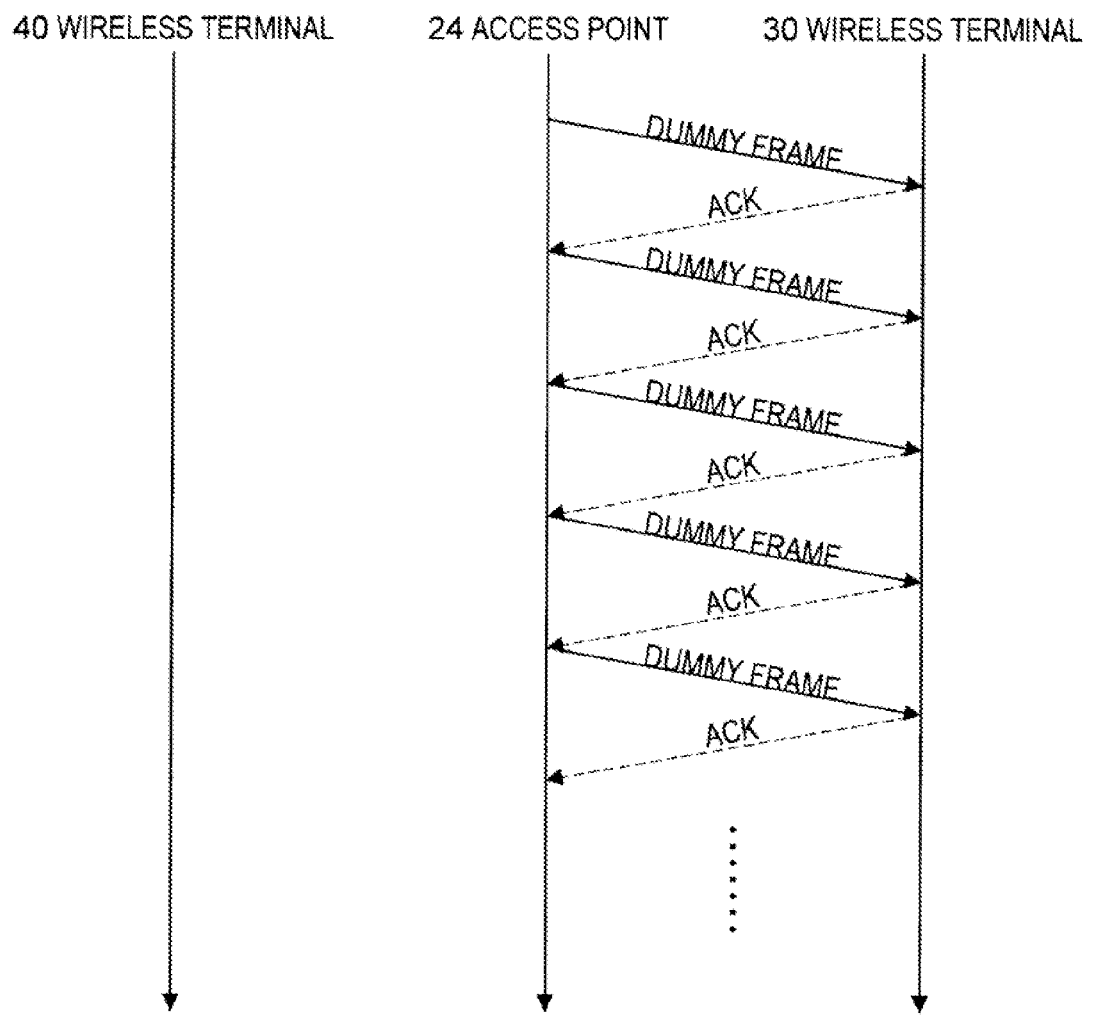
FIG. 4 is an explanatory diagram showing data transmission and reception between an access point and a wireless terminal according to the first embodiment.

FIG. 4 is an explanatory diagram showing data transmission and reception between the access point 24 and the wireless device 30. As shown in FIG. 4, the access point 24 transmits dummy frames to the wireless terminal 30 at a predetermined frequency. When the wireless terminal 30 receives a dummy frame it transmits a ACK signal, and thus the access point 24 and the station 26 can receive the ACK signals at a predetermined frequency.

The access point 24 may be set to transmit dummy frames at, for example, 20 millisecond, 50 millisecond or 100 millisecond intervals, or set to transmit dummy frames at irregular intervals 50 times, 20 times or 10 times per second. Further, the access point 24 may also be equipped with a switch portion that switches the transmission frequency interval of the dummy frames depending on the system objectives and peripheral environment.

The transmission of the dummy frames by the access point 24 may be set to start on receiving a request from the wireless terminal 30, or may be set to start depending on the determination of the access point 24.

Figure 5:
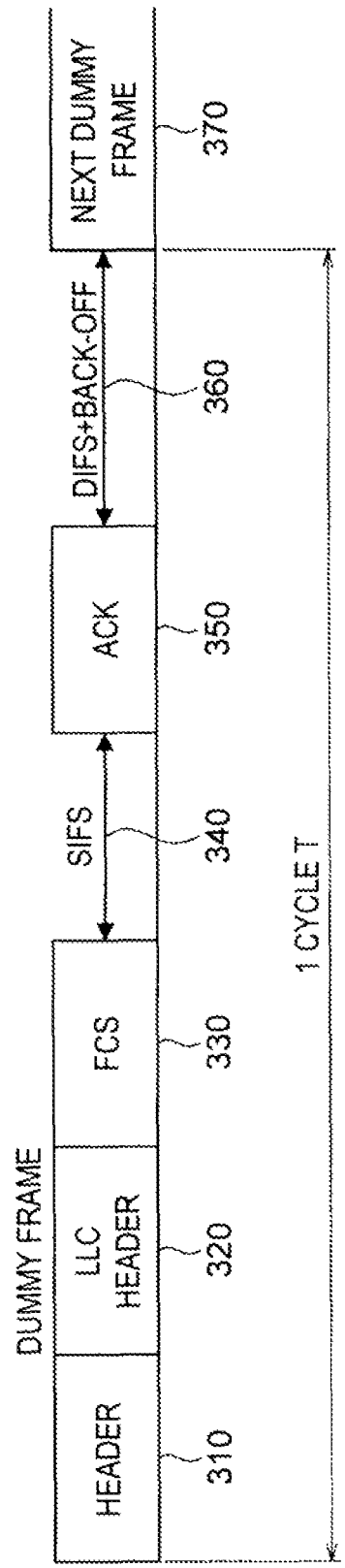
FIG. 5 is an explanatory diagram showing dummy frame and ACK signal transmission and reception in more detail.

FIG. 5 is an explanatory diagram showing the dummy frame and the ACK signal transmission and reception in more detail. First, the access point 24 transmits a dummy frame including the header 310, the Logical Link Control (LLC) header 320 and the Frame Check Sequence (FCS) 330 to the wireless terminal 30.

The header 310 indicates the start of the dummy frame, and includes, for example, the address information of the transmission source device (the access point 24). The LLC header 320 includes data relating to the data link layer, indicating, for example, in which region the frame will be stored in the memory of the transmission destination device (the wireless terminal 30). The FCS 330 corrects any errors that are found in the header 310 or the LLC header 320. Data information is included in a normal frame, but in the present embodiment, data information has been deleted from the dummy frames. Such data information includes, for example, information contained in IP headers and IP payloads. Adoption of the above-described configuration allows the dummy frame data volume to be reduced and the wireless communication bandwidth used to transmit the ACK signals to the wireless terminal 30 at the predetermined frequency to be minimized.

When the access point 24 transmits the dummy frame, the ACK signal 350 is transmitted via the short inter frame space (SIFS) 340. Then, when the ACK signal 350 is transmitted, the next dummy frame 370 is transmitted via the distributed coordination function inter frame space [DCF IFS), and the back-off period 360.

Depending on the time of the cycle T between the transmission of one dummy frame to the transmission of the next dummy frame, the bandwidth used to transmit and receive the dummy frames and the ACK signals changes. For example, for communications conforming to the IEEE802.11b standard, as the communication speed is 11 Mbps, if 1 cycle T is 200 milliseconds, only 0.2% (22 kbps) of the bandwidth is used, and if 1 cycle T is 50 milliseconds, only 0.8% (88 kbps) of the bandwidth is used.

Returning to the explanation of the structure of the movement detection device 20 with reference to FIG. 3, the elapsed time determination portion 218 measures the time elapsed from the start of the dummy frame transmission by the access point 24. If the elapsed time reaches an upper wait time limit set in advance, a report is transmitted to the station 26 indicating that the upper wait time limit has elapsed. After the station 26 receives the report, the station 26 stops attempting to detect the movement of the wireless terminal 30, and the process ends.

In other words, the above-mentioned upper wait time limit has the role of a time limit when there is proximity motion by the wireless terminal 30. Therefore, after the upper wait time limit has elapsed, the elapsed time determination portion 218 can instruct the dummy frame generating portion 214 to cease generating the dummy frames. Further, after the upper wait time limit has elapsed, the elapsed time determination portion 218 can stop the operation of the detection portion 260. The above-mentioned upper wait time limit may be set, for example, to approximately 1-2 minutes.

The measurement portion 230 measures the signal strength of the ACK signals transmitted by the wireless terminal 30. Then, the measured signal strength and the time at which the signal strength was measured are recorded as mapped measurement data in the memory 240. The memory 240 may be, for example, a non-volatile memory such as an electronically erasable programmable read-only memory (EEPROM), an erasable programmable read-only memory (EPROM), or the like, a magnetic disk such as a hard disk, a flexible disk, or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-Ray™ disc recordable (BD-R), a dual-layer Blu-Ray™ disc recordable (BD-RE), or the like, or a magneto-optical (MO) disk.

Figure 6:
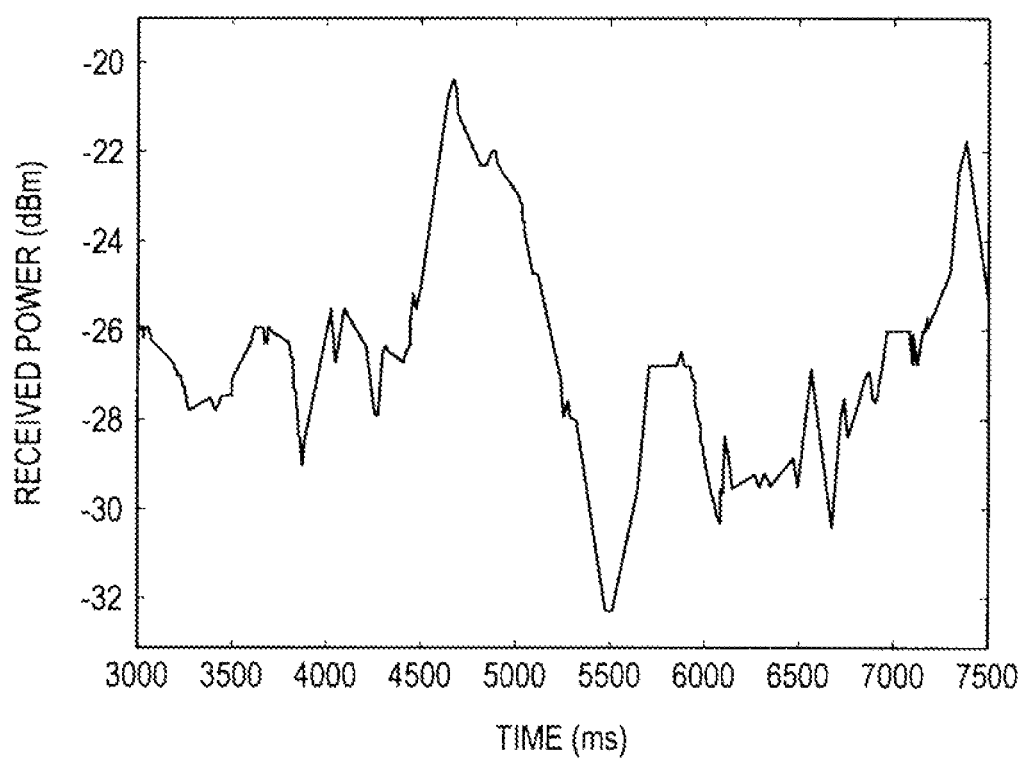
FIG. 6 is a characteristics chart showing changes in signal strength measured by a measurement portion according to the first embodiment.

FIG. 6 is a characteristics chart showing changes in the signal strength measured by the measurement portion 230. The horizontal axis shows the time (msec) and the vertical axis shows the signal strength (dBm). With reference to FIG. 6, it can be seen that the signal strength is greatest in the vicinity of 4600 milliseconds, and is weakest in the vicinity of 5500 milliseconds. As explained using Formulas 1-4, the signal strength becomes greater the closer the distance between the wireless terminal 30 and the station 26, and the signal strength becomes weaker the further the distance between the wireless terminal 30 and the station 26. Therefore, the wireless terminal 30 was closest to the station 26 in the vicinity of 4600 milliseconds, and was furthest from the station 26 in the vicinity of 5500 milliseconds.

The measurement count determination portion 250 determines whether the number of ACK signals for which the signal strength was measured by the measurement portion 230 has reached a pre-set sample count or not. Then, when the measurement count determination portion 250 determines that the ACK signal measurement count has reached the pre-set sample count, it instructs the detection portion 260 to start the proximity motion detection.

The above-mentioned preset sample count may be set as a sample count which is sufficient for the detection portion 260 (to be described later) to detect proximity motion accurately. The pre-set sample count may also be set in accordance with the frequency interval of the transmission of the above-mentioned dummy frames and ACK signals, or in accordance with the processing method used by the detection portion 260. For example, the pre-set sample count can be around 10-20.

Based on instructions from the measurement count determination portion 250, the detection portion 260 detects the proximity motion of the wireless terminal 30. A specific example of the detection processing performed by the detection portion 260 will be explained with reference to FIG. 7.

Figure 7A:
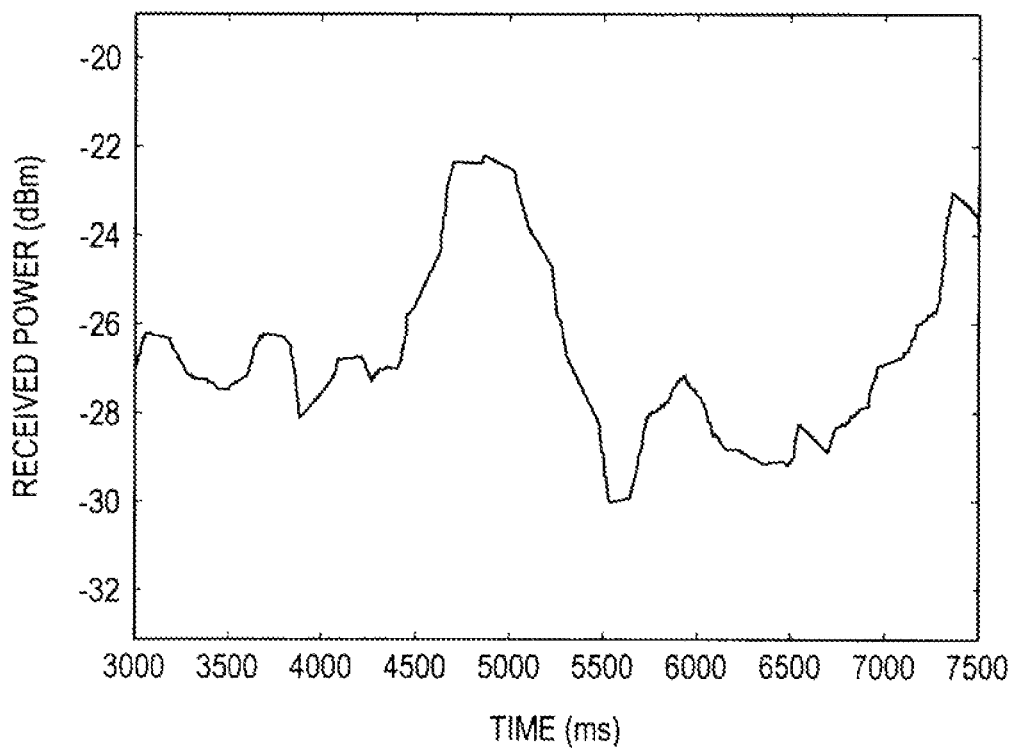
FIG. 7 is an explanatory diagram showing the process of detecting proximity motion of the wireless terminal by a detection portion according to the first embodiment.

FIG. 7 is an explanatory diagram showing the process of detecting the proximity movement of the wireless terminal 30 by the detection portion 260. First, the detection portion 260 reads the measurement data from the memory 240. As shown in FIG. 6, the measurement data often shows intense fluctuations in signal strength. These fluctuations are due to the influence of slight vibrations of the wireless terminal 30, or of noise and the like. To address this difficulty, the detection portion 260 applies a moving average algorithm, for example, to the measurement data to smooth the measurement data. When the detection portion 260 performs processing for the smoothing of the measurement data, it can smooth the signal strength changes to the degree shown in FIG. 7A.

Figure 7B:
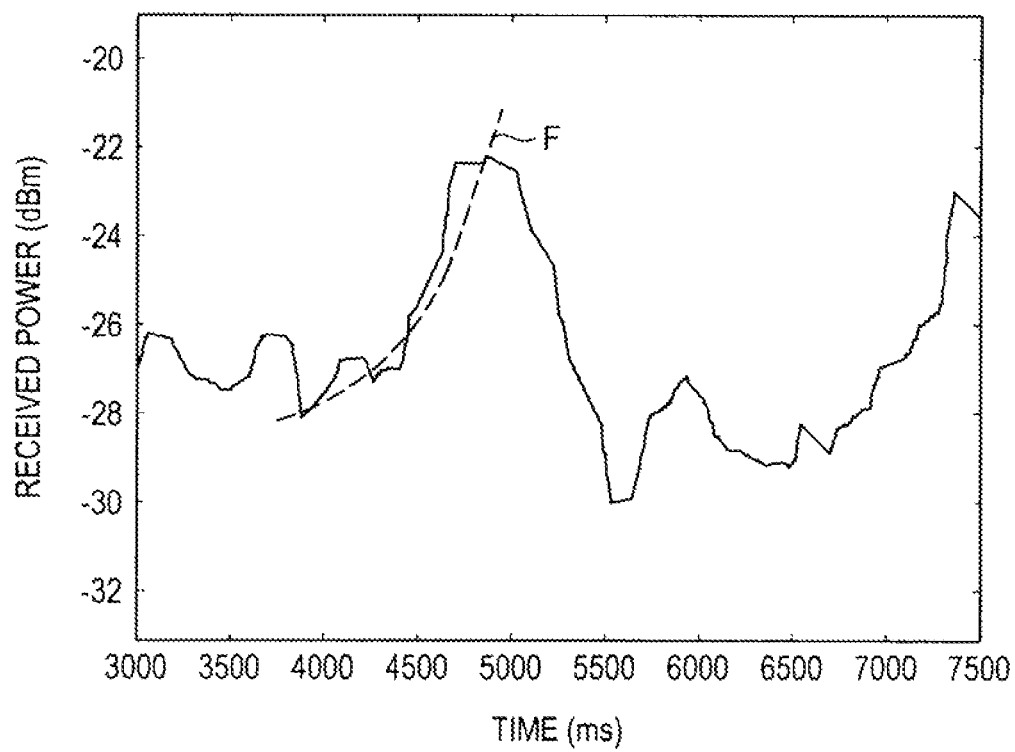

Then, the detection portion 260, while changing the analysis range of the above-mentioned smoothed measurement data, attempts approximation using the exponential function curve of the measurement data in each analysis range. Specifically, the detection portion 260 may use curve fit methods, such as the nonlinear method of least squares or logarithmic plotting or the like, to attempt approximation using exponential function curves. An example of the exponential function curve closest to the measurement data obtained from the measurement data in this way is shown in FIG. 7B. The measurement data shown in FIG. 7B for the period of time from approximately 4000 milliseconds to approximately 4700 milliseconds can be approximated using the exponential function curve F.

Then, the detection portion 260 computes the residual sum of squares between the above-mentioned exponential function curve F and the measurement data. If the residual sum of squares is smaller than a predetermined threshold value, the detection portion 260 determines that the proximity motion of the wireless terminal 30 has been detected. If the residual sum of squares is higher than the predetermined threshold, the detection portion 260 determines that proximity motion of the wireless terminal 30 did not occur within the analysis time period.

Additionally, the detection portion 260 attempts proximity motion detection while changing the analysis time period until it receives a report from the elapsed time determination portion 218 indicating that the upper wait time limit has elapsed. Then, if the proximity motion has not been detected at the point in time when the detection portion 260 receives the report that the upper wait time limit has elapsed, the detection portion 260 determines that there has been no proximity motion.

The above-mentioned predetermined threshold can be changed as necessary in accordance with the objectives and the analysis time period. For example, it is possible to lower the threshold, in order to avoid errors such as mistakenly detecting wireless terminal motion other than proximity motion as proximity motion.

The detection portion 260, in addition to the above-mentioned residual sum of squares, may also be set to determine whether proximity motion has occurred or not based on the degree of change in the signal strength. For example, if an interval of approximately 30-60 cm between the wireless terminal 30 and the station 26 is reduced to an interval of 10 cm or less, the ACK signal strength in relation to the station 26 increases by approximately 6-10 dBm or 8-10 bDm. Therefore, the configuration may be such that the detection portion 260 determines that proximity motion has been detected if there has been an exponential increase of approximately 6-10 dBm or 8-10 bDm in the signal strength during a given analysis time period.

In this way, according to the present embodiment, the movement detection device 20 can transmit the ACK signals to the wireless terminal 30 at a desired frequency interval and based on the signal strength of a sufficient number of ACK signals, can accurately detect the proximity motion of the wireless terminal 30.

When the proximity motion of the wireless terminal 30 is detected by the detection portion 260, the processing execution portion 280 performs predetermined operations. The predetermined operations may include, for example, notification to the display portion 284 to display the detection of the proximity motion, authorization of the wireless terminal 30, or notification to the access point 24 that the proximity motion has been detected.

The display portion 284 may display whether the proximity motion of the wireless terminal 30 has been detected or not. The display portion 284 may be, for example, a display device such as a cathode ray tube (CRT) display device, a liquid crystal display (LCD) device, or a lamp, or the like.

Next, the operation of the movement detection device 20 according to the present embodiment will be explained.

FIG. 8 is a flowchart showing the operating flow of the movement detection device 20 according to the present embodiment. First, the movement detection device 20 establishes a communication connection conforming to IEEE802.11 standards with the wireless terminal 30 (step S400). For example, the movement detection device 20 may perform the connection process in response to a probe request from the wireless terminal 30. Next, the movement detection device 20 transmits the dummy frames to the wireless terminal 30 at the predetermined frequency (step S404). Then, the movement detection device 20 receives the ACK signals transmitted from the wireless terminal 30 in response to the dummy frames (step S408).

The movement detection device 20 then measures the signal strength of the ACK signals (step S412). Then, the movement detection device 20 determines whether the number of measured ACK signals has reached the pre-set sample count (step S416). If it determines that the number of measured ACK signals has not reached the pre-set sample count, the movement detection device 20 once more transmits the dummy frame (step S404). If, on the other hand, it determines that the number of measured ACK signals has reached the pre-set sample count, the movement detection device 20 analyzes the measured ACK signal measurement data (step S420).

Next, from the results of the signal strength analysis, the movement detection device 20 determines whether the proximity motion has been detected or not (step S424). If the movement detection device 20 determines that the proximity motion has been detected, it determines, that the proximity motion has been detected (step S428). If, on the other hand, the movement detection device 20 determines that the proximity motion has not been detected, it determines whether the upper wait time limit has elapsed (step S432). If the movement detection device 20 determines that the upper wait time limit has not elapsed, it once more transmits the dummy frame (step S404). If, however, the movement detection device 20 determines that the upper wait time limit has elapsed, it concludes that the proximity motion has not been detected (step S436).

The above described movement detection system 10 of the present embodiment may be applied to access point authorization. Access point authorization using the movement detection system 10 according to the present embodiment will now be explained while making comparisons with known methods.

For example, for wireless systems in a particular closed space, such as a store or event venue, it is desirable to authorize the use of the access point 24 (base station) by the wireless terminal 30 inside the particular closed space only, and not to authorize use of the access point 24 by the wireless terminal 30 outside the particular closed space. In known technology, various methods have been suggested for achieving this objective. A first method uses a wired equivalent privacy (WEP) key. In specific terms, each owner of each wireless terminal 30 inside the particular closed space is notified of a WEP key, and each owner sets up the WEP key in his/her own wireless terminal 30.

However, with the above-mentioned first method, the owner of the wireless terminal 30 is burdened with the time and effort to set up the WEP key. Further, the owner of the wireless terminal 30 could notify a third party outside the particular closed space of the WEP key and the wireless terminal 30 of the third party outside the particular closed space could then use the access point 24.

A second method uses a MAC address for the wireless terminal 30 to authorize use of the access point 24. With the second method, it is possible to authorize only the specified wireless terminal 30 to use the access point 24, and from a security point of view, the second method has advantages over the above-mentioned first method. However, the job of obtaining and recording the MAC addresses of all the wireless terminals 30 to be authorized by the access point 24 is likely to be a huge burden.

Here, the access point authorization according to the present embodiment addresses the problems posed by the above-mentioned first and second methods, and the access point authorization according to the present embodiment removes the excessive burden on the wireless terminal 30 owner and allows the authorization of the wireless terminal 30 by the access point 24 while maintaining security. The specific method will now be described.

First, the wireless terminal 30 attempts to connect to the access point 24 running on an open system authorization without a WEP key. The access point 24, as it is operating open system authorization, unconditionally accepts the wireless terminal 30 connection demand. Next, the access point 24 repeatedly transmits dummy frames to the accepted wireless terminal 30 until an upper wait time limit of around 1-3 minutes has elapsed.

Next, the owner of the wireless terminal 30 receiving the dummy frames brings the wireless terminal 30 closer (the proximity motion) to the station (measurement terminal) 26 provided in the particular closed space before the upper wait time limit elapses. When the station 26 detects the proximity motion of the wireless terminal 30, the station 26 transmits the MAC address obtained from the wireless terminal 30 beacon frame to the access point 24.

Next, the access point 24 registers the wireless terminal 30 MAC address received from the station 26, and maintains the connection with the wireless terminal 30 with the registered MAC address. On the other hand, the access point 24 terminates connection with any of the wireless terminals 30 with a MAC address that has not been received from the station 26 before the upper wait time limit has elapsed.

Using the above-mentioned access point authorization, the owner of the wireless terminal 30 need only take a straightforward action, namely to move the wireless terminal 30 closer to the station 26, which is a significant simplification in comparison to the use of a WEP key as in the above-described first method. Further, it is difficult for a third party outside the particular enclosed space to move the wireless terminal 30 closer to the station 26, and authorization is therefore secure.

As explained above, with the movement detection system 10 according to the first embodiment of the present invention, the movement detection device 20 transmits the dummy frames at the predetermined frequency, and the wireless terminal therefore also transmits the ACK signals at the predetermined frequency. The strength of the ACK signals to the movement detection device 20 changes depending on the distance between the movement detection device 20 and the wireless terminal 30. Therefore, the movement detection device 20 can accurately detect the spatial movement of the wireless terminal 30 based on the strength of the ACK signals.

The dummy frames according to the present embodiment do not include data information. The dummy frame data capacity can therefore be minimized, allowing the greater part of the bandwidth to be allocated to the other fundamental wireless communications between the wireless terminal 30 and the movement detection device 20.

The detection portion 260 determines the occurrence of the proximity motion based on whether there are exponential changes in the measurement data or not. It may be assumed that the signal strength of the ACK signals transmitted by the wireless terminal 30 conforming to IEEE802.11 standards will change exponentially if the distance between the wireless terminal 30 and the measurement portion 230 changes at a uniform speed. Therefore, the detection portion 260, based on whether the measurement data changes exponentially, can precisely detect the proximity motion of the wireless terminal 30.

Further, a program that causes a computer to function as the above-described movement detection device 20 and a storage medium for storing the program are also provided.

Second Embodiment

Next, a movement detection system 10 according to a second embodiment of the present invention will be explained. The movement detection system 10 according to the second embodiment differs from the first embodiment in that it includes at least two or more stations 26 as measurement terminals. As a result of this structural difference, the second embodiment can detect more complex spatial movement of the wireless terminal 30. Next, the movement detection system 10 according to the second embodiment will be explained with reference to FIG. 9.

Figure 9:
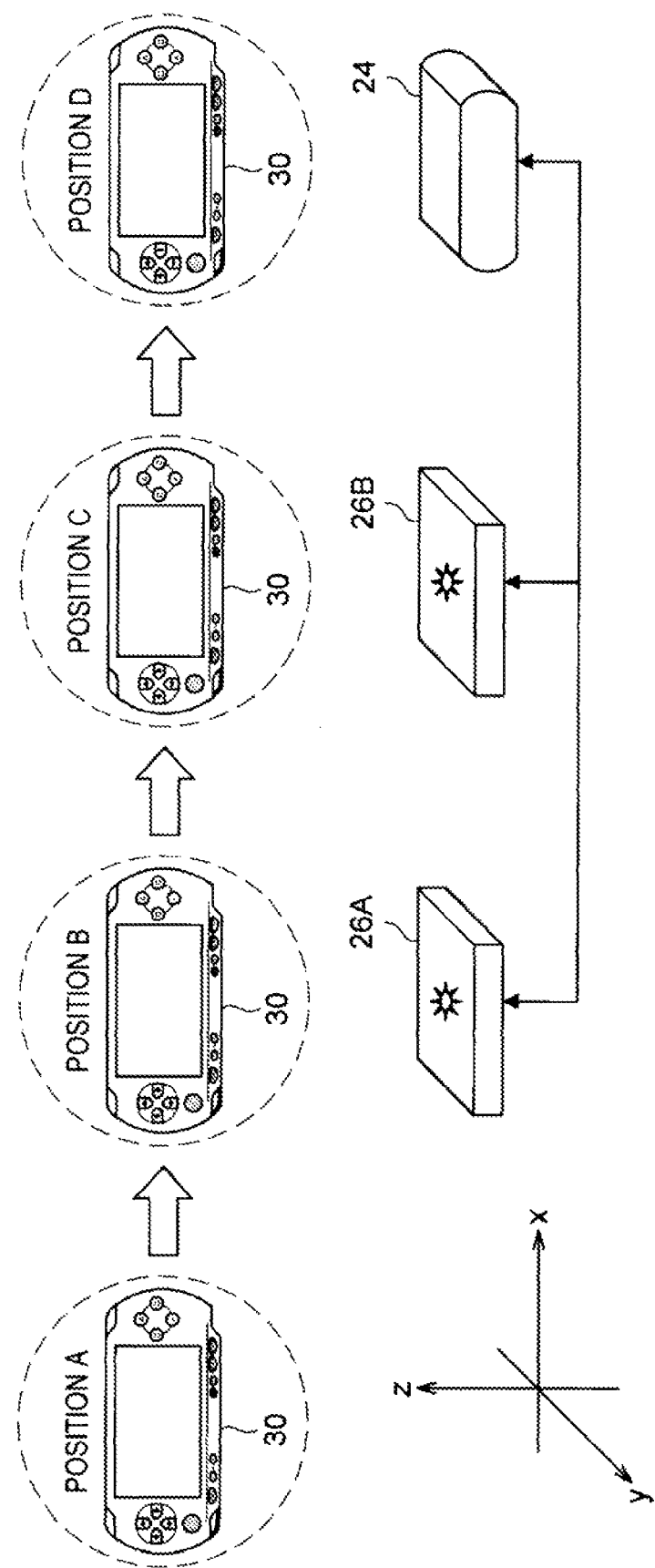
FIG. 9 is an explanatory diagram showing the structure of a movement detection system according to a second embodiment of the present invention.

FIG. 9 is an explanatory diagram showing the structure of the movement detection system 10 according to the present embodiment. The movement detection system 10 includes the movement detection device 20, including the access point 24, the station 26A and the station 26B, and the wireless terminal 30. The structure and the operation of the access point 24 are substantially identical to those explained in the first embodiment, and thus a further explanation is omitted here. The structure and the operation of the station 26A and the station 26B are roughly the same as explained for the station 26 in the first embodiment. However, while the measurement portion 230 may be provided in both the station 26A and the station 26B, with regard to the remaining structure, the set up can be for either the station 26A or the station 26B only.

FIG. 9 shows what happens when the station 26A and the station 26B are positioned separately on the x axis and the wireless terminal 30 moves from a position A to a position D in the x direction. During that time, the access point 24 transmits the dummy frames to the wireless terminal 30 and the wireless terminal 30 transmits the ACK signals in response to the dummy frames.

The wireless terminal 30 is closest to the station 26A when the wireless terminal 30 reaches position B, so the signal measured by the station 26A is at its strongest at that point. Next, the wireless terminal 30 is closest to the station 26B when it reaches position C, so the signal measured by the station 26B is at its strongest at that point.

Here, the detection portion 260 determines whether the signal measured by the station 26A or the signal measured by the station 26B is at its strongest, and in addition to detecting proximity motion, the detection portion 260 can detect whether the wireless terminal 30 has moved from position D to position A (in the x direction), or whether the wireless terminal 30 has moved from position A to position D (in the reverse x direction). In other worlds, the detection portion 260 can detect whether the movement of the wireless terminal 30 includes a vector component in the x direction or not.

Note that, when the signal strength measured by the station 26A is decreasing exponentially and the signal strength measured by the station 26B is increasingly exponentially, it can be assumed that the wireless terminal 30 is moving away from the station 26A towards the station 26B. Therefore, the detection portion 260, based on the changes in the signal strength measured by both the stations 26, can detect whether the movement of the wireless terminal 30 includes a vector component in the x direction or not.

In this way, using the movement detection system 10 according to the second embodiment, in addition to detecting the motion of the wireless terminal 30, it is possible to detect whether the movement of the wireless terminal 30 includes a vector component in the x direction or not. In addition, if multiple stations 26 are provided, more complex movements by the wireless terminal 30 can be detected. For example, if an additional station 26 is provided in the y direction also, the x-direction component and y-direction component of the movement of the wireless terminal 30 can be detected, and therefore, movements of the wireless terminal 30 describing circular or rectangular movements on the x-y plane can be detected. If additional stations 26 are provided in the y direction and in the z direction, 3-dimensional movement of the wireless terminal 30 can be accurately detected.

It should be understood by those skilled in the art that various modifications, combinations, sub-combinations and alterations may occur depending on design requirements and other factors insofar as they are within the scope of the appended claims or the equivalents thereof.

For example, in the above-described first embodiment, a structure is explained in which the movement detection device 20 is separate from the access point 24 and the station 26. However, the invention is not limited to the above-described examples. For example, the movement detection device 20 may be integrated, as a single unit with the access point 24 and the station 26.

In addition, in the explanation of the first embodiment above, the station 26 includes the measurement count determination portion 250, the detection portion 260, and the processing execution portion 280 and the like, but these portions may be provided on the access point 24 side.

Moreover, in the explanation of the first embodiment above, the detection portion 260 detected the proximity motion based on whether there were exponential changes in the measurement data or not, but the present invention is not limited to this example. For example, a structure may be adopted in which the detection portion 260 detects the proximity motion based on whether there are quadratic exponential or high-order exponential changes in the measurement data.

Further, there is no need for each processing step performed by the movement detection device 20 in this specification to be conducted chronologically in accordance with the order shown in the flowcharts. The steps may also be performed in parallel or individually (for example, parallel processing or processing with object-oriented programming.)

What is claimed is:

1. A movement detection system, comprising:
   a wireless terminal;
   a movement detection device connectable via a wireless network to the wireless terminal,
   wherein the movement detection device transmits detection signals used for detection at a predetermined frequency to the wireless terminal, and the wireless terminal transmits a verification signal in response to each detection signal, and
   wherein the movement detection device comprises:
      a detection signal transmission portion that transmits the detection signals;
      a measurement portion that measures a signal strength of the verification signals transmitted by the wireless terminal, wherein the measured signal strength and the time at which the signal strength is measured are stored as mapped measurement data in a memory device; and
      a detection portion configured for performing a movement detection process comprising:
         retrieving the mapped measurement data from the memory device, the mapped measurement data including the measured signal strength and the time;
         smoothing a curve representing a relationship between the measured signal strength of the verification signals and the time within a time period;
         applying an approximation function to fit the smoothed curve;
         determining a difference between the curve and the approximation function; and
         detecting spatial movement of the wireless terminal based on a result of comparison between the difference and a threshold value.

2. The movement detection system of claim 1, further comprising:
   a measurement count determination portion that:
      determines whether the number of the verification signals measured by the measurement portion has reached a pre-set sample count, and
      instructs, after determining that the number of the verification signals has reached the pre-set sample count, the detection portion to start the movement detection process.

3. The movement detection system of claim 1, wherein the detection portion attempts to apply the approximation function to fit the smoothed curve while changing a range of the measured signal strength.

4. A movement detection device connectable via a wireless network to a wireless terminal, comprising:
   a detection signal transmission portion that transmits detection signals to the wireless terminal at a predetermined frequency;
   a measurement portion that measures a signal strength of verification signals transmitted by the wireless terminal in response to each of the detection signals, wherein the measured signal strength and the time at which the signal strength is measured are stored as mapped measurement data in a memory device; and
   a detection portion configured for:
      retrieving the mapped measurement data from the memory device, the mapped measurement data including the measured signal strength and the time;
      smoothing a curve representing a relationship between the measured signal strength of the verification signals and the time within a time period;
      applying an approximation function to fit the smoothed curve;
      determining a difference between the curve and the approximation function; and
      detecting spatial movement of the wireless terminal based on a result of comparison between the difference and a threshold value.

5. The movement detection device according to claim 4, wherein the detection signals are dummy frames that do not contain data information.

6. The movement detection device according to claim 4, wherein the spatial movement is movement that lengthens or shortens the distance between the wireless terminal and the measurement portion.

7. The movement detection device according to claim 4, further comprising:
   an elapsed time determination portion that determines whether a pre-set upper wait time limit has elapsed from the start of the transmission of the detection signals,
   wherein the detection portion attempts to perform the movement detection process while changing the time period until the detection portion receives a signal from the elapsed time determination portion indicating that the pre-set upper wait time limit has elapsed from the start of the transmission of the detection signals.

8. The movement detection device according to claim 4, wherein the measurement portion is provided in a plurality, the measurement portions being positioned in at least two or more different locations, and the detection portion detects the spatial movement of the wireless terminal based on the strength of verification signals measured by each measurement portion.

9. The movement detection device according to claim 4, wherein the detection portion detects the movement of the wireless terminal based on whether the signal strength of the verification signals changes exponentially.

10. A movement detection method for detecting movement of a wireless terminal via a wireless network, comprising the steps of:
- transmitting, by a processing device, detection signals via the wireless network to the wireless terminal at a predetermined frequency;
- measuring a signal strength of verification signals transmitted by the wireless terminal, using the processing device, in response to each of the detection signals, wherein the measured signal strength and the time at which the signal strength is measured are stored as mapped measurement data in a memory device;
- retrieving the mapped measurement data from the memory device, the mapped measurement data including the measured signal strength and the time;
- smoothing a curve representing a relationship between the measured signal strength of the verification signals and the time within a time period;
- applying an approximation function to fit the smoothed curve;
- determining a difference between the curve and the approximation function; and
- detecting spatial movement of the wireless terminal, using the processing device, based on a result of comparison between the difference and a threshold value.

11. A non-transitory computer readable storage medium having stored therein a computer program that comprises instructions that command a computer to execute:
- transmitting detection signals via a wireless network to a wireless terminal at a predetermined frequency;
- measuring a signal strength of verification signals transmitted by the wireless terminal in response to each of the detection signals, wherein the measured signal strength and the time at which the signal strength is measured are stored as mapped measurement data in a memory device;
- retrieving the mapped measurement data from the memory device, the mapped measurement data including the measured signal strength and the time;
- smoothing a curve representing a relationship between the measured signal strength of the verification signals and the time within a time period;
- applying an approximation function to fit the smoothed curve;
- determining a difference between the curve and the approximation function; and
- detecting spatial movement of the wireless terminal based on a result of comparison between the difference and a threshold value.

* * * * *